(Model.)
H. GREEN, Dec'd.
J. BIRD, Administrator.
PIPE JOINT.
No. 334,526. Patented Jan. 19, 1886.
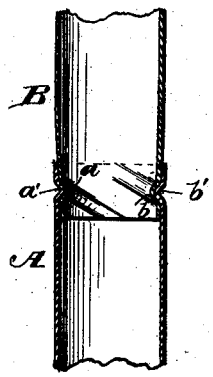
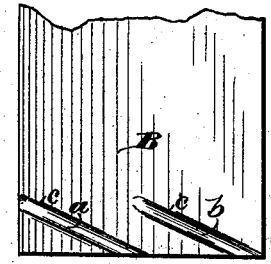
Witnesses
Robert Everett
E. A. Dick
Inventor
Henry Green
By
C. H. Nelson & Co.
Atty

UNITED STATES PATENT OFFICE.

HENRY GREEN, OF OSAKIS, MINNESOTA, ASSIGNOR OF ONE-HALF TO JOSEPH BIRD, OF SAME PLACE; JOSEPH BIRD ADMINISTRATOR OF SAID GREEN, DECEASED.

PIPE-JOINT.

SPECIFICATION forming part of Letters Patent No. 334,526, dated January 19, 1886.

Application filed June 9, 1885. Serial No. 168,171. (Model.)

*To all whom it may concern:*

Be it known that I, HENRY GREEN, of Osakis, in the State of Minnesota, have invented certain new and useful Improvements in Pipe-Joints; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1 is a side view of two pipe-sections secured together in accordance with my invention. Fig. 2 is a longitudinal section of Fig. 1. Fig. 3 represents a section of pipe, showing the joint in the material before being formed into pipe.

This invention is designed with special reference to stove-pipe joints; but it is manifest that it can be used in connection with other pipes for a similar purpose, and has for its object the firmly holding of the two sections together, and yet at the same time allowing of the two sections being easily and quickly separated or unfastened and put together without any undue effort or labor.

The essential feature in connections of this sort is to so construct them that they can be easily and quickly separated without any great effort. I may state, however, in the outset that I am aware that a series of slots and nipples to slide therein have been used for the same purpose which I have in view; also, that a series of slots and nipples having a large flat head have also been made use of, and also that I am aware internal spiral beads have been employed for substantially the identical purpose.

The present improvement is the outgrowth of defects discovered in my invention shown, described, and claimed in my application filed November 21, 1884, Serial No. 148,477, for Letters Patent of the United States. In that case I discovered, after duly experimenting, that the spirally-formed internal beads and external grooves would interlock and hold together so firmly and securely the two pipe-sections when placed upon one another that it is almost impossible to separate them without mashing or injuring them in some one way or other, thereby rendering them worthless and unfit for further use. To remedy this defect is the prime object of this invention.

I accomplish this end by employing an ordinary stove-pipe (shown in two sections, A B) having formed in both of their ends parallel spiral grooves *a b*, located directly opposite each other. These grooves are made preferably slightly inclined, so that when the two sections A B are put together the internal beads, *a' b'*, in section A will fit into grooves *a b* in section B, and a slight turn of one within the other will cause them to be firmly and securely interlocked in proper position.

It will be readily seen and understood that the grooves, while rather short, should also be long enough, of course, to allow one section to enter the other far enough for all practical purposes. I have found from practical use that a joint of this sort, while firmly and securely holding the two sections together, will readily and quickly yield and allow the sections to be easily separated with but slight effort. Devices heretofore used for this purpose require great strength and labor to uncouple the sections, and this is the great objection to the use of the internal spiral bead formed nearly around the entire pipe.

To further guard against undue hugging of one section upon the other, great care must be taken to form the edges *c c* of the grooves perfectly smooth and round, (in contradistinction to sharp edges,) as seen in the drawings.

I am aware that a pipe-joint has hitherto been made in which a series of angled grooves are formed in one section and the other section provided with a series of nipples. These nipples correspond in location and number to angled grooves formed in the other section of pipe, and when the two sections are united they pass up the grooves to the angles, and by giving either or both sections of the pipe a partial rotation the nipples are forced up the inclined part of the angled grooved section, thereby locking the two sections together.

I therefore do not claim herein such devices as my invention for locking the pipe-sections together.

In my construction of stove-pipe joints both of the sections have at their ends and on opposite sides thereof double depressions, forming spiral grooves on the outer ends of the sections, whereby the sections are readily and easily connected together, and when so connected or disconnected the depressions are prevented from being bent or getting out of shape, as is now the case with stove-pipes, and also with beaded pipe-joints now in common use.

What I claim as new and of my own invention is as follows:

A stove-pipe section having at its ends and on opposite sides thereof double depressions *a b*, forming parallel spiral grooves on the outer ends of said section, substantially as shown and described, and for the purpose set forth.

In testimony that I claim the foregoing as my own I have hereto affixed my signature in presence of two witnesses.

HENRY GREEN.

Witnesses:
J. M. MADISON,
L. JOHNSON.